Oct. 6, 1942.                H. A. FOOTHORAP                2,298,116
                COMBINED CALCULATING AND RECORDING MACHINE
                        Filed June 25, 1938          8 Sheets-Sheet 2

Inventor
HARRY A. FOOTHORAP
L. G. Julihn
Attorney

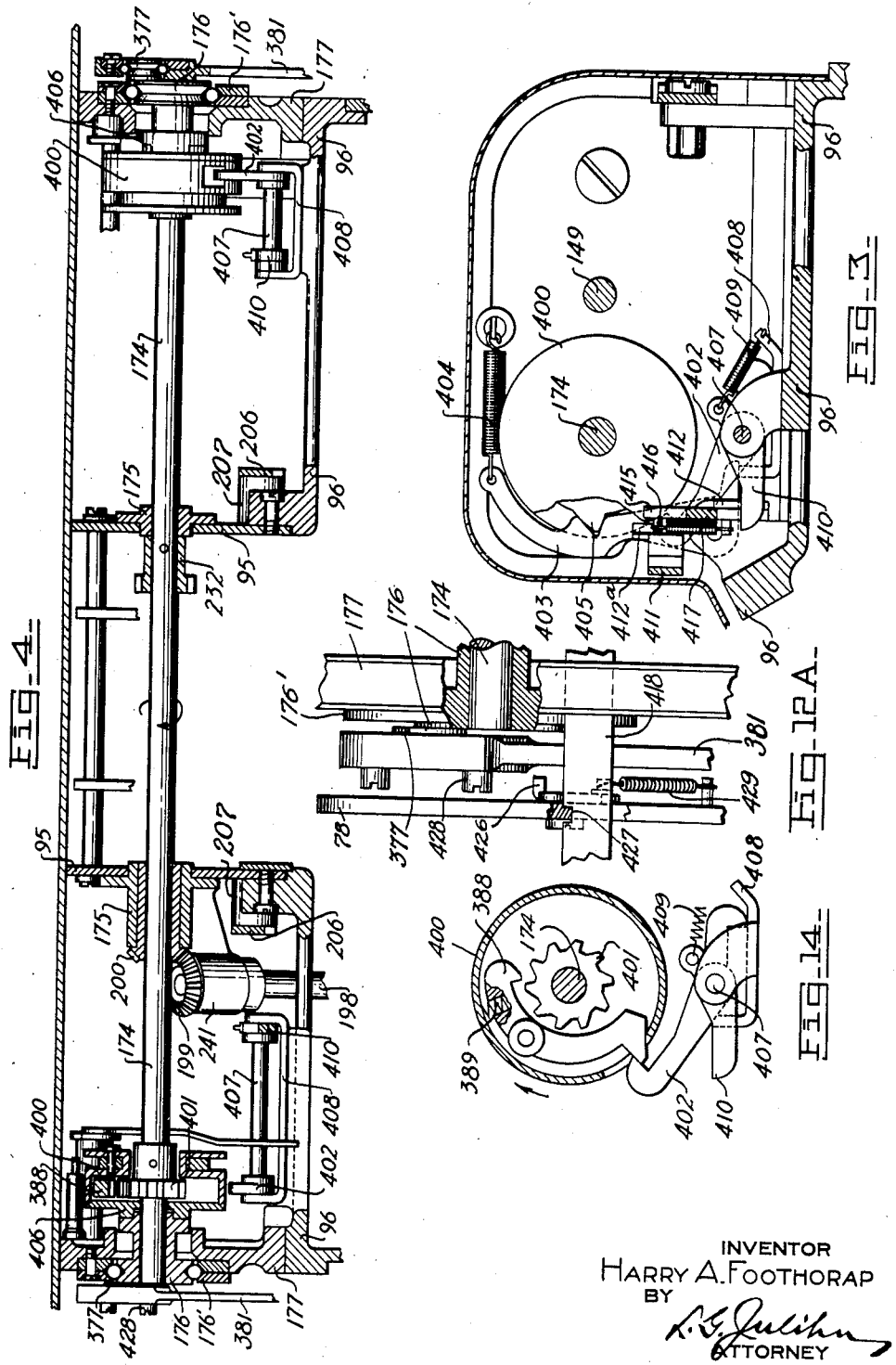

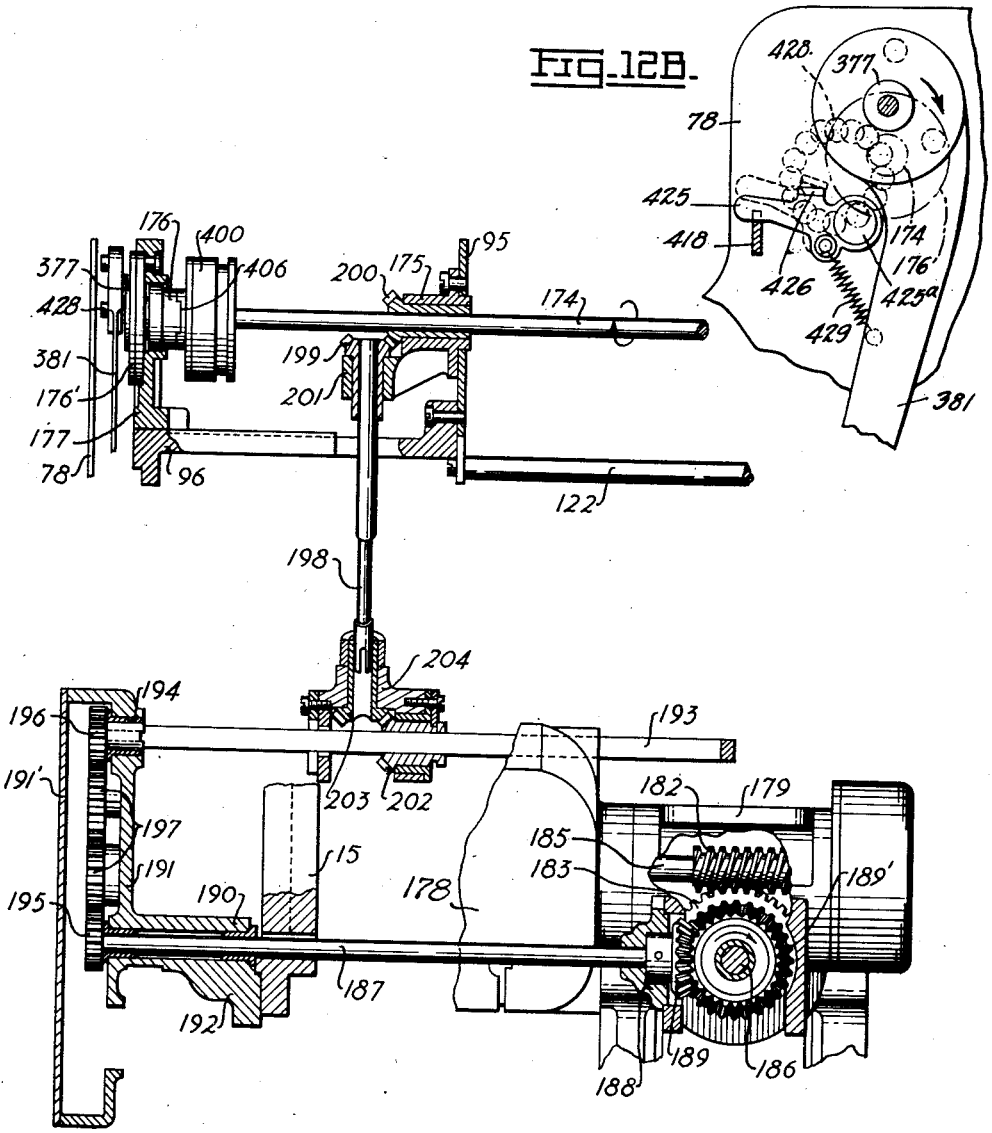

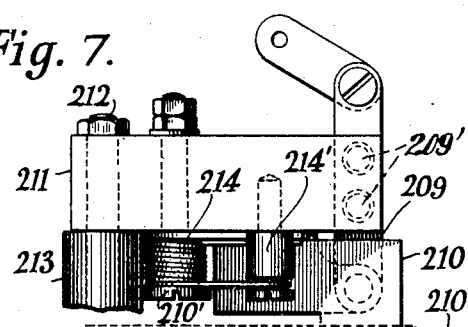
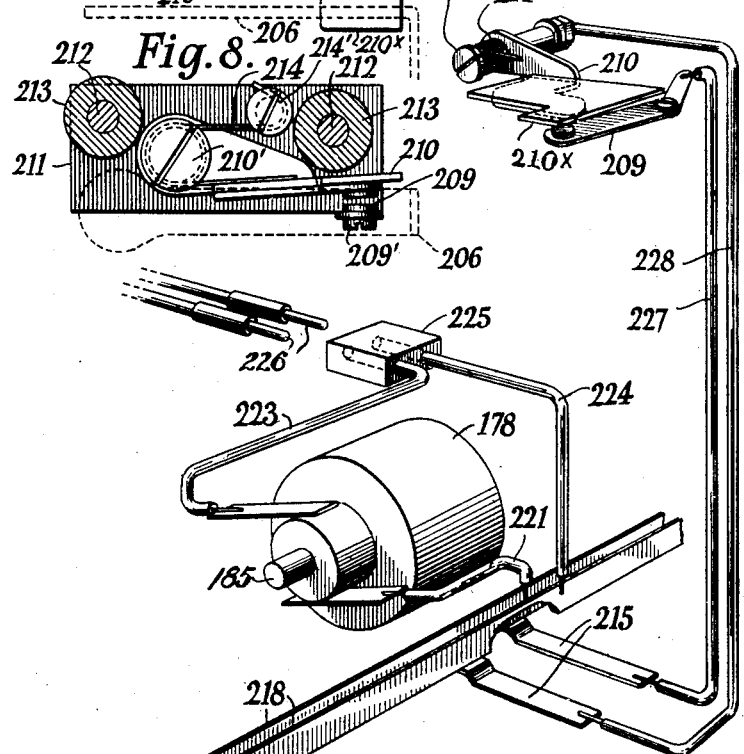
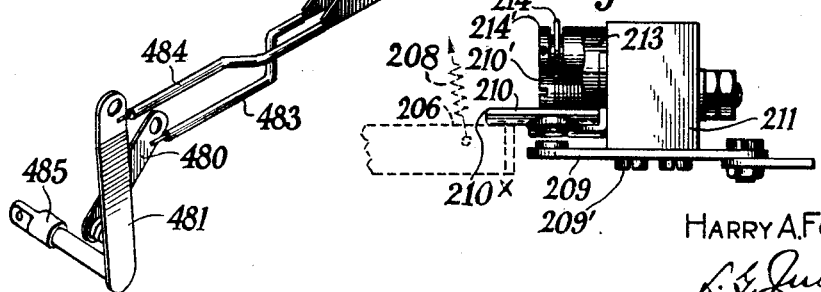

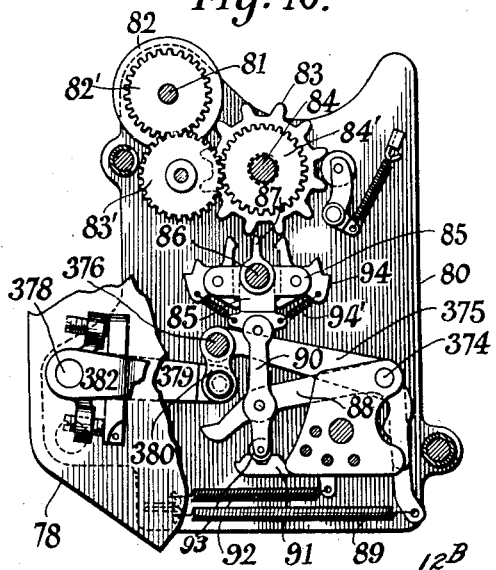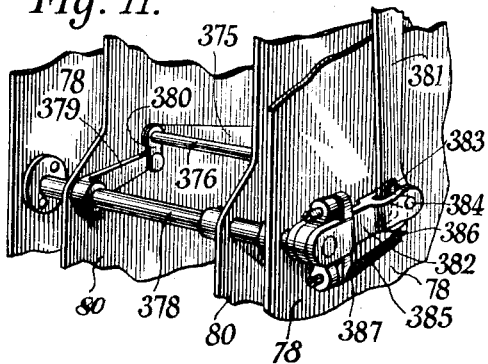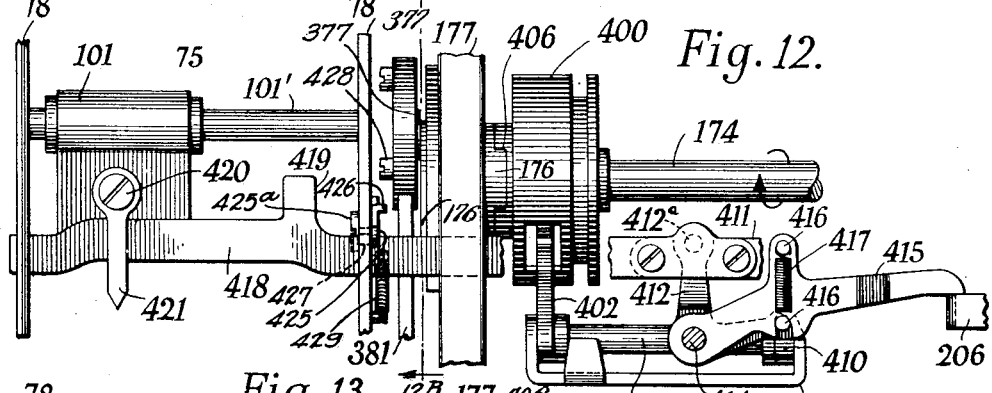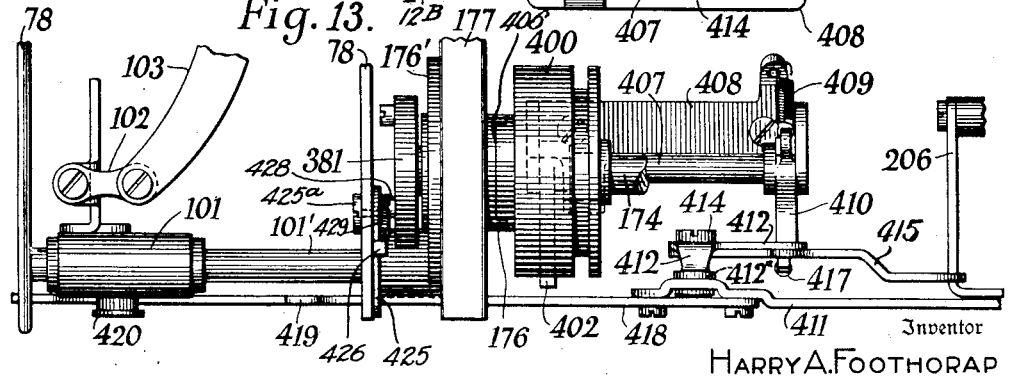
Harry A. Foothorap
Attorney

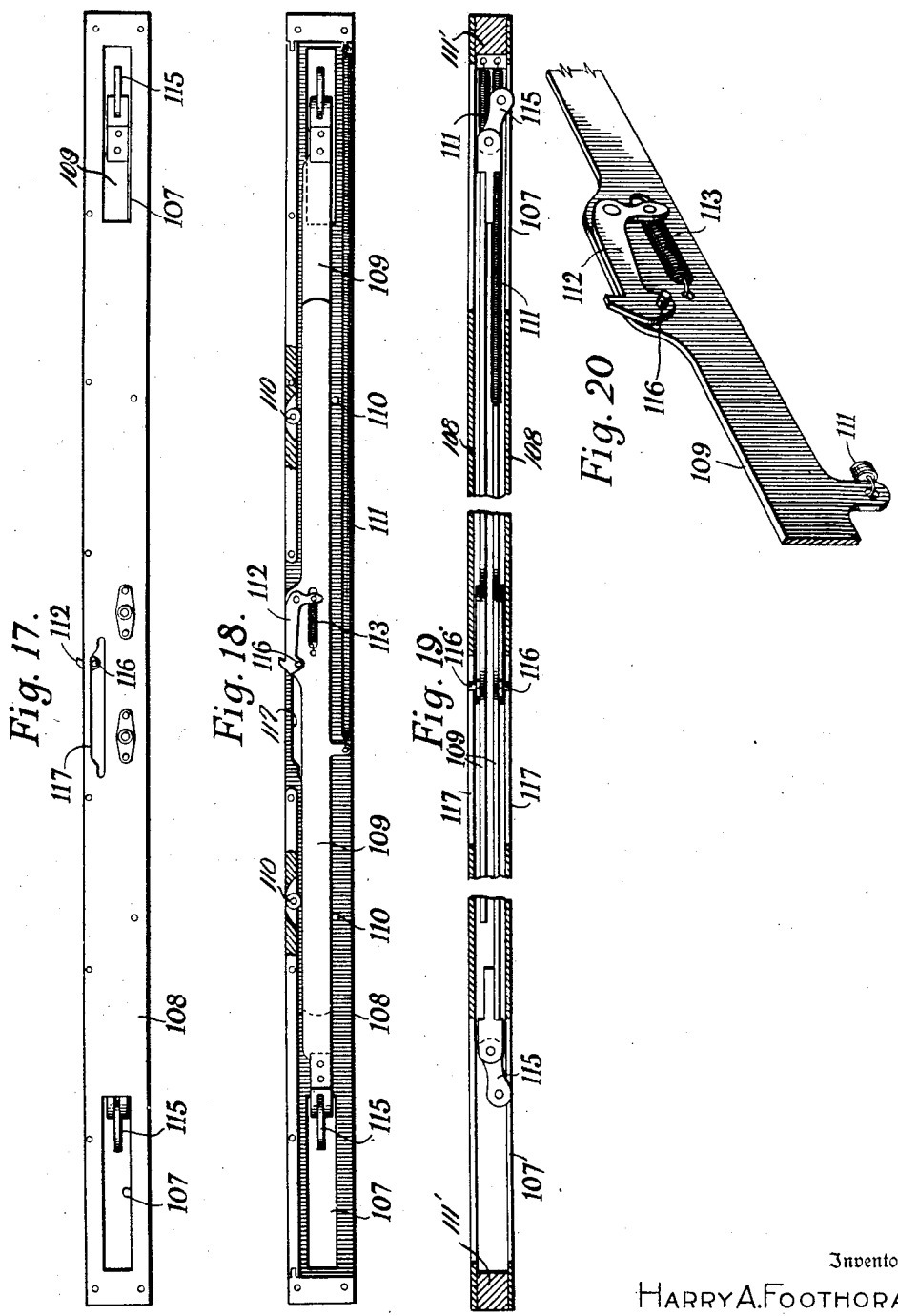

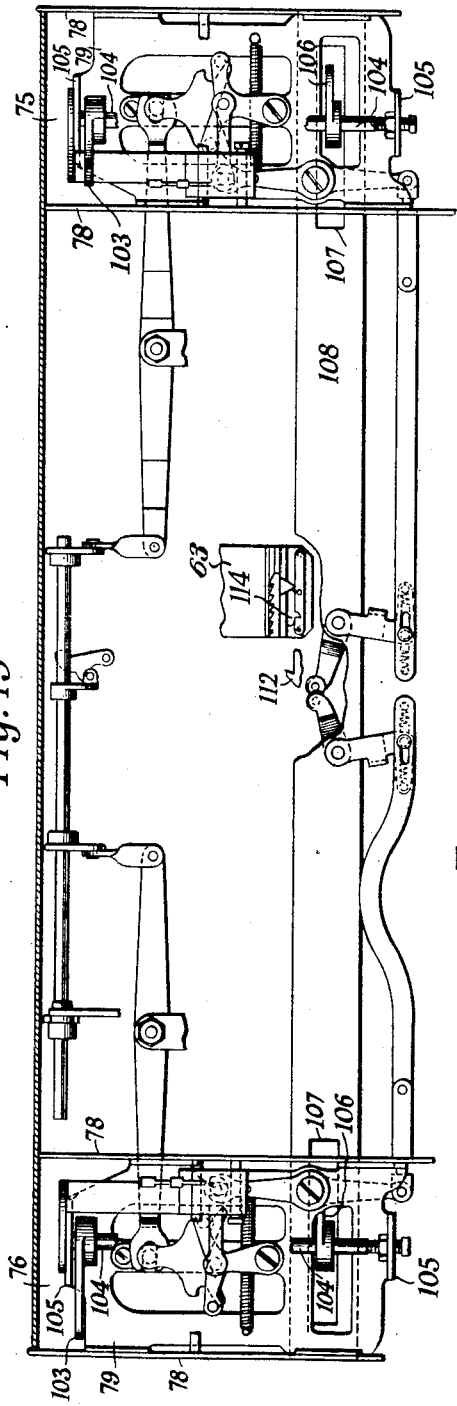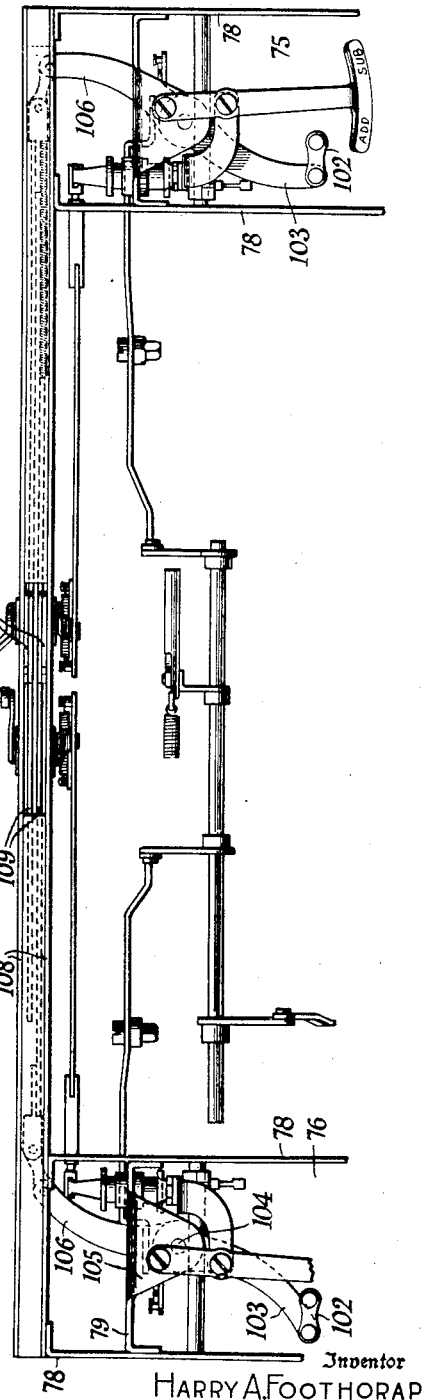

Patented Oct. 6, 1942

2,298,116

UNITED STATES PATENT OFFICE 2,298,116

COMBINED CALCULATING AND RECORDING MACHINE

Harry A. Foothorap, Harrisburg, Pa., assignor to Underwood Elliott Fisher Company, New York, N. Y., a corporation of Delaware Original application December 30, 1932, Serial No. 649,663. Divided and this application June 25, 1938, Serial No. 215,823

18 Claims. (Cl. 235—59)

My invention relates to combined calculating and recording machines, and more particularly to improvements in combined calculating and typewriting machines of the class known commercially as the Elliott Fisher billing machine.

By way of explanation, the Elliott Fisher machine, with which my invention is particularly concerned, is a combined calculating and typewriting mechanism distinguished, in its typewriting aspect, by down strike printing mechanism, and keys mounted on a carriage to travel over a subjacent flat platen. Viewed in its computing aspect, it is characterized by one or more so-called column registers past which the carriage travels, a grand totalizer or crossfooter register mounted on and travelling with the carriage, and column and crossfooter register master wheels or actuators mounted on the carriage and crossfooter register frames, respectively, to effect denominational selection in their related registers incident to the step by step letter spacing travel of the carriage, and operated in synchronism by the number keys of the machine, to accumulate values in the registers as they are printed, digit by digit in different columns. Usually the carriage is adapted to travel over the work to both line and letter space the printed record.

One object is to equip the carriage with two grand totalizers or crossfooter registers, which may be power-operated either in unison or singly, as desired, state control mechanism being associated with the crossfooter registers, whereby either crossfooter register may be caused to either add or subtract in connection with any column register.

Another object is to equip the cross-footer registers with transfer restoring mechanism automatically operative by a motor on the frame, under control of the denominational selecting mechanism of the crossfooter registers.

To the accomplishment of the foregoing and other and subordinate objects, one embodiment of my invention has been illustrated in the accompanying drawings and will now be set forth in detail, and defined in the claims appended hereto.

Reference is directed to my co-pending application, filed December 30, 1932, Serial No. 649,663, of which the present application is a division, and to the divisional applications, filed November 11, 1935, Serial No. 49,158, and that filed April 4, 1938, Serial No. 199,837, for claims to such mechanisms as are disclosed in the present application, but not claimed herein.

In the drawings:

Figure 3 is a fragmentary longitudinal section taken on line 3—3 of Figure 2;

Figure 4 is a fragmentary view in transverse vertical section showing the general operating shaft of the machine and its connections for actuating the carry restoring mechanism of the crossfooters, parts being omitted for the sake of clearness;

Figure 5 is a detail vertical sectional view, showing only the drive train from the motor to the general operator shaft;

Figure 6 is a perspective view of the motor controlling mechanism;

Figure 7 is a top plan view of a circuit making and breaking device forming part of said motor controlling mechanism;

Figure 8 is a side elevation partly in section, of said device;

Figure 9 is an end view thereof;

Figure 10 is a detail view partly in side elevation, and partly in section, of one of the crossfooter registers, illustrating the transfer and transfer restoring mechanism;

Figure 11 is a fragmentary perspective view of said crossfooter register further illustrating the transfer restoring mechanism;

Figure 12 is a fragmentary view of mechanism for automatically operating the transfer restoring mechanisms of the crossfooter registers;

Figure 1:
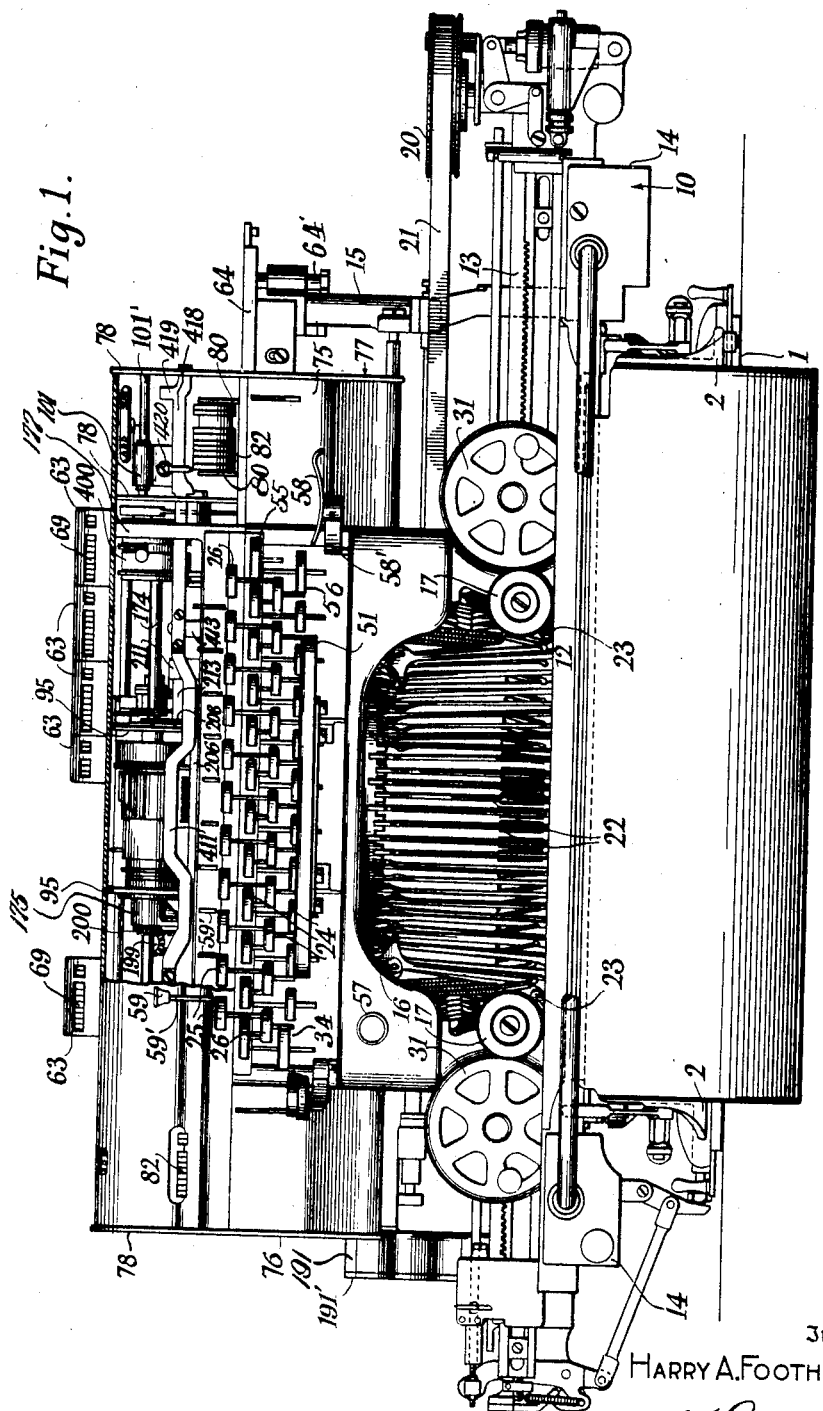
Figure 1 is a view in front elevation of an Elliott Fisher type of machine equipped according to my invention.

Figure 12ª is a fragmentary detail front view of the tripping bar, and its latch, the frame being partly broken away to more clearly show the notch in the bar with which the latch engages;

Figure 12ᵇ is a fragmentary detail side view of the eccentric head of the pitman, and the latch, to show how the latch is disengaged from the sliding bar by a stud on the eccentric head;

Figure 13 is a front elevation of the same;

Figure 14 is a view partly in section and partly in side elevation, of a clutch forming part of the mechanism for automatically restoring the transfer mechanism of the crossfooter registers;

Figure 15 is a fragmentary view in front elevation, partly in section, showing the denomination-selecting mechanism for the two crossfooters;

Figure 16 is a top plan view of the same;

Figure 17 is a view in side elevation of the housing for the coupling bars forming part of the denomination-selecting mechanism;

Figure 18 is a similar view with one side plate of the housing removed to expose the coupling bars and associated parts;

Figure 19 is a top plan view partly in section, of the housing and coupling bars; and Figure 20 is a fragmentary perspective detail of one of the coupling bars with its pick-up member.

My invention herein disclosed is conveniently applied to a machine of the well-known Elliott Fisher type, having a flat platen and a travelling key carriage, as exemplified, for instance, in my Patent 1,904,127, dated April 18, 1933.

As the subject matter of the present invention does not depend for its novelty on the main supporting structure, or upon the printing or recording mechanism, the latter will be but briefly referred to.

A base 1 of the machine, (Figure 1), includes laterally spaced, parallel side bars 2 connected by front, rear and intermediate cross-braces (not shown).

A track frame 10 is mounted upon and arranged transversely across the side bars 2. The track frame 10 includes front and rear rails 12 and 13, respectively, connected by side members 14, terminating at their rear ends in upright brackets 15, one only of which is shown.

The printing mechanism is of the usual Elliott Fisher type disclosed substantially in my U. S. Patent No. 1,251,361, dated December 25, 1917.

This printing mechanism is mounted in a carriage 16 supported by sets of front and rear wheels 17, the front set only being shown, travelling on the rails 12 and 13 of the track frame 10 to enable the carriage to advance from left to right in letter spacing direction and return.

A power barrel 20 mounted on the track frame 10, is connected to the travelling carriage 16 by a tape 21 to advance the carriage in letter spacing direction under control of the usual carriage escapement mechanism (not shown).

Mounted on the carriage 16 are down strike type bars 22 operable through connections 23 by the usual alphabet keys 24, value or numeral keys 25, and clear signal keys 26, the respective key levers 27, 28 and 29 (Figure 2), of which are suitably fulcrumed in the carriage 16, and normally held in their upper positions by the usual springs (not shown).

The machine embodying my present invention is equipped with two crossfooter registers, presently to be described, and with two clear signal keys 26.

Figure 2:
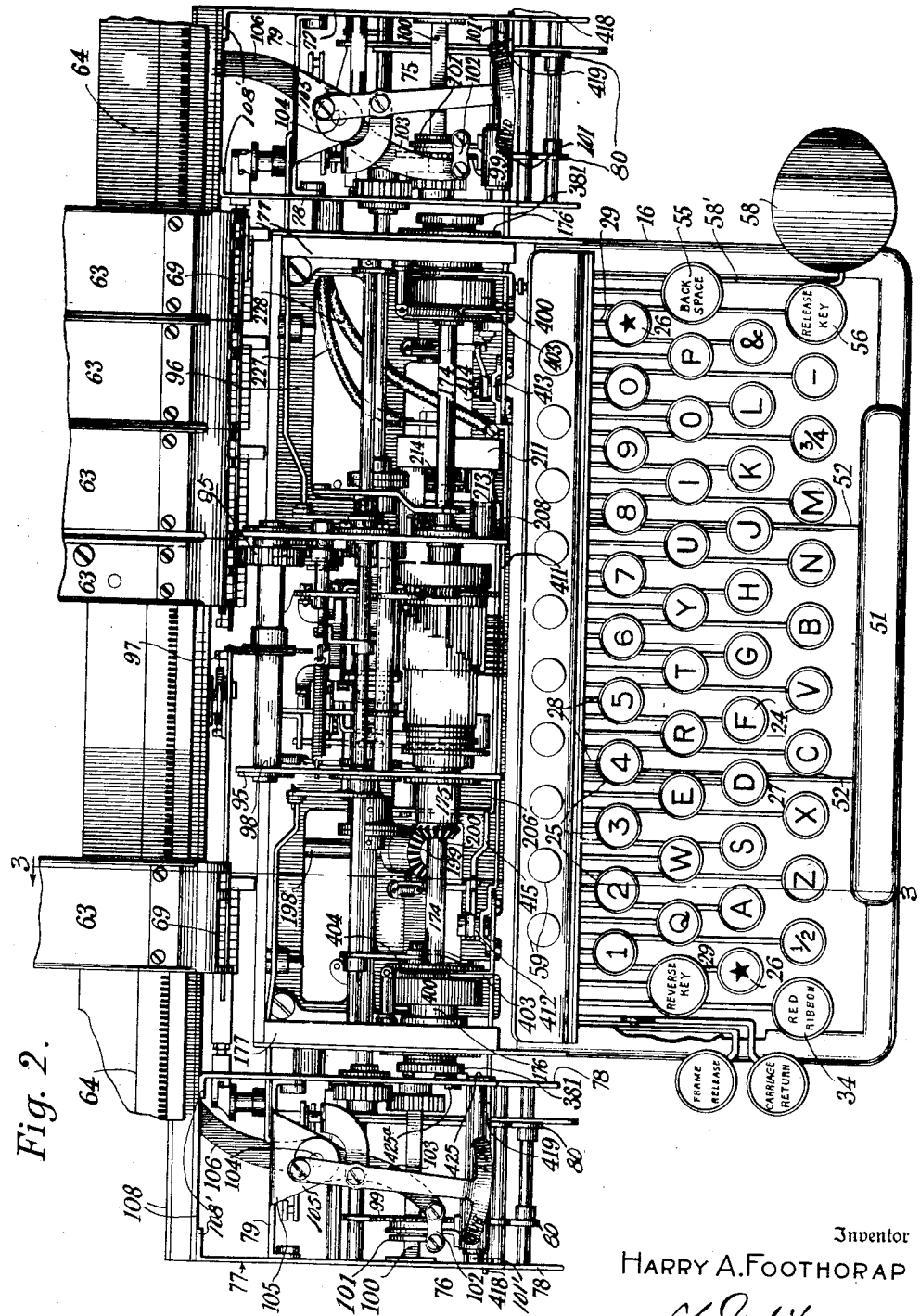
Figure 2 is a view in top plan, drawn to an enlarged scale, with the sub-structure and other parts omitted for the sake of clearness in illustration.

The machine is equipped with the usual well-known ribbon mechanism including ribbon spools 31, (Figure 1), and a color field controlling ribbon shift key 34, (Figure 2).

Associated with the letter spacing escapement mechanism of the key carriage 16 are the usual carriage release and back spacing keys 55 and 56, respectively, as shown in my U. S. Letters Patent No. 1,203,519, and No. 1,203,520, both issued October 31, 1916.

A line finder key 57, (Figure 1), operates line finder mechanism such as shown in my U. S. Letters Patent No. 1,383,096, June 28, 1921.

A carriage tabulator 58 with its key lever 58' and decimal tabulator keys 59 with their key levers 59' control a tabulating mechanism such as that disclosed in my U. S. Letters Patent No. 1,280,697, dated October 8, 1928.

The usual space bar 51, (Figures 1 and 2), mounted near the forward ends of parallel arms 52 suitably pivoted in the carriage, controls the escapement in the customary manner.

COMPUTING MECHANISM

*Column registers*

Column registers 63, (Figures 1 and 2), one for each column of work, are adjustably mounted on a register bar 64 secured by screws 64' to the brackets 15 of the track frame 10 rearwardly of the carriage 16.

The column registers 63 are of the usual two-way, reversible type embodying the usual denominational value indicating wheels 69 visible through sight openings formed in the respective column registers. The denominational value indicating wheels 69 are individually and successively driven differentially according to the values of the particular numeral keys depressed, through a toothed actuator or master wheel 97.

Each column register is provided with a two-way transfer and transfer restoring mechanism.

*Crossfooters or grand totalizers*

Crossfooters or grand totalizers 75, 76, (Figures 1, 2 and 10), are suitably secured to the right and left hand sides, respectively, of the carriage 16, to travel therewith. These crossfooters are substantially identical in construction and hence, a description of one will suffice for both.

The crossfooter main frame 77 includes right and left side plates 78 and a rear plate 79, enclosing a crossfooter register sub-frame, the sides 80 of which sub-frame embrace the register per se. The denominational value indicating wheels 82 are journaled on a shaft 81, (Figure 10), mounted in the sides 80 of the sub-frame, and are adapted to be driven in opposite directions for addition and subtraction, respectively, by toothed denominational number wheels, as shown at 83, journaled on a shaft 84 also mounted in the sub-frame. The number wheels 83 drive their corresponding value-indicating wheels 82 through the intermediate gears 84', 83' and 82'. Associated with the number wheels 83 is a two-way transfer mechanism of the type disclosed in my U. S. Patent No. 1,576,961, dated March 16, 1926, which includes a series of transfer heads, one of which is shown at 85, mounted to rock upon a fixed shaft 86 to either side of a normal central position. Rocking movement of a transfer head 85 is effected initially by a transfer tooth (not shown) on an associated number wheel 83 engaging a trip member 87 on the head, to move the latter in one direction or the other, at the proper time. Movement of a head 85 is continued in the direction in which it was tripped by actuating mechanism, including an actuator lever 88, a spring 89 urging the lever toward the axis of the head, and a link connection 90 between the head and actuator lever. The arrangement of each head and its actuating mechanism is such that, in the normal position of the parts, they assume a dead center position providing a toggle lock resisting the urge of the spring 89, in which position they are yieldingly held by a pivoted detent 91 urged by a spring 92 against a roller 93 on one end of the link 90. Combined carrying fingers and locking dogs 94, tensioned by springs 94', are mounted on each head to execute a carrying step of movement in carrying or borrowing direction, respectively, upon the next higher number wheel 83, and for yielding movement on their heads to facilitate return of the parts to normal position.

Denomination selecting means for column registers

Mounted at the rear of the carriage 16, (Figures 1, 2 and 4), between brackets 95 upstanding from a carriage top plate 96, is the usual toothed actuator or master wheel 97 fast upon a master wheel shaft 98 journaled at its opposite ends in said brackets. The master wheel 97 is advanced laterally step by step with the carriage 16 in the usual manner, well understood in the art, to select the number wheels 69 of the column registers 63 for operation in denominational correspondence with the orders in which digits are printed in the columns.

Denomination selecting mechanism for crossfooters

Denomination selection in the crossfooters 75 and 76 is effected in correspondence with the order of printing by the following means. Each crossfooter 75 and 76 includes the usual toothed master wheel 99, (Figure 2), and squared master wheel shaft 100 for rotating said master wheel and along which the master wheel advances laterally across the number wheels 83 of the crossfooter register. The master wheel shaft 100 extends between the side walls 78 of the crossfooter frame. Associated with each master wheel 99 is mechanism for advancing said wheel step by step from its normal ineffective position one step to the left of the number wheels 83 into meshing engagement with each successive number wheel.

The master wheel advancing mechanisms, (Figure 2), each include a master wheel carriage 101 movable on guides 101' and connected by a link 102 to a forwardly extending crank arm 103 fast near the upper end of a vertical master wheel advancing shaft 104 journaled in forwardly bent ears 105 on the crossfooter rear plate 79. A rearwardly extending crank arm 106, (Figure 2), fast on said shaft 104 near its lower end, projects through a slot 107 in one of a pair of laterally spaced housing plates 108, arranged across the rear of the carriage and suitably secured to lateral ears formed on rearwardly extending lugs 109' of the side walls 78 of the crossfooters 75 and 76, to travel beneath the column registers 63 with said carriage. A pair of longitudinally slidable coupling bars 109, (Figures 18 and 19), one of which is associated with each arm 106, are mounted, side by side, between upper and lower series of rollers 110 and between said plates 108. Springs 111 anchored to one of the filler blocks 111' between the ends of the housing plates 108, yieldingly connect said plates 108 and bars 109 to urge the coupling bars 109 to the right, as viewed in Figures 18 and 19. A coupling dog 112 urged upwardly by a spring 113, is pivoted on each bar 109 to engage and interlock with a lug 114 on the bottoms of each of the column registers 63 when the carriage 16 has advanced the printing point of the machine to within one letter space of a column position on the work. Engagement of a dog with a lug 114 arrests movement of its bar 109 relatively to the carriage, and against the action of its spring 111. Normally the coupling dogs lie one behind the other, (Figure 19), adjacent the printing point of the machine. The corresponding crank arms 106 and coupling bars 109 are connected by links 115, so that when either bar 109 is held stationary, continued advance of the carriage 16 will advance the appropriate master wheel 99 for proper denominational selection in the related crossfooter. Projecting studs 116, (Figures 17 to 20), on the respective dogs 112, enter elongated cam slots 117 in the respective plates 108, the studs cooperating with the cams formed at the ends of the slots to uncouple the dogs and release the bars 109 when the printing point of the machine advances in letter spacing direction past the lowest denominational order of the column position, whereupon the springs 111 retract the master wheels 99 across their respective crossfooter registers, to their normal positions, one step to the left of the wheel of highest denomination, as will be clear.

The means for advancing the crossfooter master wheels 99 co-incidentally with the advance of the column register master wheel 97 is fully set forth in the parent application above referred to.

The numeral key controlled means for effecting differential movement of the column register and crossfooter master wheels 97 and 99, respectively, need not be herein explained as it is fully set forth in the parent application, it being sufficient to state that the differential mechanism is driven from a general operator shaft 174.

The shaft 174, (Figures 1, 2, 4 and 5), extends across the carriage 16 and through bushings 175, (Figure 4), in the vertical brackets 95, the ends of the shaft 174 terminating adjacent the inner side plates 78 of the crossfooters 75 and 76 (Figure 1). The ends of the general operator shaft 174 are journaled in sleeves 176 rotatably mounted in anti-friction bearings 176' supported in brackets 177 rising from the carriage top plate 96.

The general operator shaft 174 is driven in clockwise direction, looking from the right, by an electric motor 178 (Figure 5), suitably connected at the rear of the machine to the rear face of the rail 13 of the track frame 10. A worm 182 and a worm gear 183 connect the armature shaft 185 of the motor to a short transmission shaft 186 journaled in the transmission casing 179.

A main drive shaft 187 extending transversely of the machine at the rear thereof is journaled at one end in a bearing 188 in the transmission casing 179, the inner end of the main drive shaft carrying a bevel gear 189 fast thereon within the transmission casing 179, and in mesh with a co-acting bevel gear 189' fast on the adjacent end of the short transmission shaft 186. The opposite end of the main drive shaft 187 extends through an opening in the left hand vertical bracket 15 and through a bearing sleeve 190 into a gear housing 191, which may be integral with the bearing sleeve 190, constituting part of a bracket 192 secured to the outer face of the vertical bracket 15. A cover plate 191' closes the outer end of the gear housing.

Above the main drive shaft 187 is a transversely extending squared spline shaft 193 having a bearing (not shown) at its right hand end in the adjacent bracket 15. The left hand end of the spline shaft 193 projects through a bearing 194 into the gear housing 191, such left hand end being equipped with a gear 196 to which power is transmitted from the main drive shaft 187 through a gear 195 fast thereon and in train with the intermediate gears 197, journaled on stub-shafts in the housing.

An inclined jack shaft 198, is operatively connected at its upper end to the general operator shaft 174 by beveled gears 199 and 200, fast on said shafts, respectively, the elongated sleeve of the beveled gear 199 fast on the jack shaft, being journaled for support in the above-mentioned bushing 175 projecting from the left hand bracket 95, the elongated hub of the left hand bushing 175 being provided with a bearing 201 arranged at right angles to horizontal shaft 174, for this purpose.

The spline shaft 193 is operatively connected to the lower end of the jack shaft 198 by beveled gears 202 and 203 on said shafts, respectively, mounted in an angular bearing member 204 similar to the bearing member 175, suitably secured to the carriage 16 and slidable along the spline shaft 193 so the gears 202, 203 can move axially of the shaft 193 with the shaft 174 and the carriage 16, as the latter advances in letter spacing direction and return.

MAIN DRIVE CONTROL

A motor control bail 206 (Figures 1, 2, 4 and 7-9), embraces the upstanding brackets 95, the arms of the bail being pivoted to studs 207 projecting outwardly from the sides of the brackets, as shown in Figures 2 and 4. A spring 208 connected to one arm of the bail 206 and anchored to the adjoining bracket 95 tends to hold the bail at the limit of its upward movement. Adjacent one side of the bail 206 is a circuit making and breaking device in the form of fixed and movable contact members 209 and 210 (Figures 6-9, both inclusive), one of which members is secured by screws 209', and the other of which members is secured by a binding post 210' to an insulator block 211 supported by and spaced apart from the right hand bracket 95, (Figure 2), by laterally extending bolts 212 and insulator sleeves 213. The movable contact member 210 is arranged to overlie the fixed member 209 and the adjacent arm of the motor control bail 206, (Figures 7 and 9), such movable contact member being urged downwardly toward contacting position by a spring 214 coiled about the extended end of the binding post 210'. The spring 214 is tensioned by fastening one end to a screw 214', the opposite end of the spring bearing against the contact 210 to urge the latter against the contact 209 and close the circuit. The spring 208 of the control bail 206 is stronger than the contact spring 214, so that the control bail 206 normally holds the movable contact member 210 out of contacting position, but depression of the bail 206 enables the spring 214 to close the circuit whereby to energize the motor.

A pair of stationary contacts or bus-bars 218 are imbedded in parallel relation in an insulating strip (not shown) secured to the front face of the rear rail 13 of the track frame 10 for engagement by a pair of suitably insulated brushes 215, (Figure 6), mounted on the carriage 16 to travel therewith. Each of these brushes 215 maintains wiping engagement with the lower edge of its respective bus-bar 218. A lead 221 connects one bus-bar 218 to one side of the motor 178. Leads 223 and 224 connect the other side of the motor and the remaining bus-bar 218, respectively, with a plug socket 225 for receiving the usual power leads 226. The fixed and movable contact members 209 and 210 of the circuit making and breaking device are each connected to one of the brushes 215, the one by a wire 227, and the other by a wire 228, so that the circuit may be made or broken through the motor through contact members 209 and 210.

AUTOMATIC CROSSFOOTER RESTORING MECHANISM

Returning now to the crossfooters or grand totalizers 75 and 76, reference to Figures 10 and 11 discloses a rocking transfer restoring bail 375 pivoted at 374 to the inner faces of the walls 80 of the sub-frame of a grand totalizer, it being understood that each crossfooter is similarly equipped. The transfer restoring bail 375 includes a cross rod 376 overlying the outer free ends of the actuator levers 88 of the denominational transfer mechanisms of its respective totalizer. The bail normally lies apart from the free ends of the actuator levers to avoid interference with the levers during carrying operations. Depression of the bail will engage and return any tripped transfer lever 28 and its related transfer head 85 to its normal cocked position.

The particular novel feature constituting the invention to which this application is directed, will now be set forth. The transfer restoring bails 375 are power-operated by the general operator shaft 174 through driving connections between said shaft and said bails, as follows:

Associated with each transfer restoring bail 375 is a bail rocker, including a rock shaft 378 journalled in the crossfooter plates and subframe 78 and 80, respectively, bail rocking arms 379 fast on said shaft 378, and links 380 connecting said arms 379 and the cross rod 376 of the transfer restoring bail.

We have seen that the ends of the general operator shaft 174 are journaled in sleeves 176, (Figure 4), supported for rotation in the brackets 177. The rotatable sleeves 176 form part of pitman connections between opposite ends of the general operator shaft 174 and the bail rockers 378—380 of the crossfooters 75 and 76, respectively. Each pitman connection includes a pitman rod 381, (Figures 4, 5 and 11), the upper end of which is eccentrically connected at 377 to the outer disklike face of its sleeve 176, the lower end of the pitman being connected to a crank 382 fast on the rock shaft 378 of the related crossfooter, so that a single revolution of the sleeve 176 will depress the transfer restoring bails 375 to effect a transfer restoring operation and then return said bails to their home positions. A slot 383 in said pitman rod 381 receiving a stud 384 on the crank 382, provides a lost motion connection between the pitman rod 381 and crank 382, permitting rebound of the rocker 378, 379 and restoring bail 375 under the quick drive of the general operator shaft 174 as a safety provision against breakage, said slot being open for quick detachment of the pitman rod 381. A spring 385 having its ends connected to the rod 381 and crank 382, as at 386 and 387, respectively, retains the rod 381 operatively connected with its crank.

Associated with each sleeve 176 is a single revolution, transfer-restoring clutch, (Figures 2, 4, 5 and 12 to 14), including a clutch dog 388 and spring 389 mounted in a housing 400 journaled on the general operator shaft 174, and forming a part of said sleeve, a ratchet wheel 401 fast on the general operator shaft 174, and a rocking, clutch-tripping arm 402. A notched detent lever 403, (Figures 2 and 3), tensioned by a spring 404 engages a detent tooth 405 on the housing 400 to prevent backlash in the crossfooter transfer-restoring mechanism.

The housings 400 and the sleeves 176 are connected by interlocking lugs 406, (Figures 4, 5, 12 and 13), for convenience in assembling and disassembling the construction. Operation of the transfer restoring clutches and of the detent levers 403 is readily understood. The tail of the clutch dog 388 pivoted within the rotatable pawl housing 400, projects through a slot in the periphery of the housing for normal engagement by the hooked, clutched-tripping arm 402.

The clutch-tripping arms 402, (Figures 3, 4 and 12 to 14), are fast upon individual rock shafts 407 mounted in suitably secured brackets 408 and each is yieldingly held in clutch-disengaging position by a spring 409 having its opposite ends connected to the bracket 408 and to a crank arm 410 fast on the shaft 407. The transfer-restoring clutches become simultaneously effective upon the disengagement of their respective clutch-tripping arms 402 from their clutch dogs 388 by the action of a tripping bar 411, (Figures 1, 2, 3, 12 and 13), extending transversely of the machine and operatively connected at 412ª, to the upwardly extending arms of bell cranks 412 and 413, respectively pivoted at 414, the remaining arms of the bell cranks being arranged to overlie the crank arms 410 on the respective rock shafts 407, so that movement of said tripping bar in the proper direction will operate through the bell cranks 412, 413 and offset crank arms 410 and shafts 407 to rock the clutch-tripping arms 402 to release the clutch dogs 388, and enable the latter, under the tension of their springs 389, to engage the ratchet wheels 401.

A motor control finger 415 is pivoted co-axially with one of the bell crank levers 412, the free end of the finger being arranged to overlie the motor control bail 206. Studs 416 on the bell crank 412 and finger 415, respectively, and a spring link 417 superior to the spring 208 of the motor control bail 206, operatively connect the crank 412 and finger 415 for depression of the bail 206 and consequent energizing of the motor 178 when the transfer restoring clutches are engaged, and to provide a yielding safety connection in the event of obstruction to the operation of said bail.

The tripping bar 411 is operated to engage the transfer-restoring clutches and to incidentally energize the motor 178, through the above-described connections, by the denomination selecting mechanism of the crossfooters 75 and 76 under control of the master wheel-advancing mechanism of either crossfooter. To this end, the opposite ends of the tripping bar 411 are provided with extensions 418 projecting into the crossfooters 75 and 76, respectively, and guided in the side frames 78 thereof for operation of the bar 411 by the master wheel carriages 101 co-incidentally with the advance of the master wheels 99 to the right of the number wheels 83 of lowest order. For operating the bar 411 by the master wheel carriages 101, lugs 419, (Figures 12 and 13), are provided on the extensions 418 with which collide studs 420 which, in the present instance, secure the usual indicators 421 to the respective master wheel carriages 101. The spring 409 aided by the motor circuit bail-restoring spring 208 returns the rock shaft 407, clutch tripping arm 402 and tripping bar 411, to their normal positions, upon the quick return of either or both master wheel carriages 101 to their normal left hand positions one step to the left of the number wheels 83 of highest order, under the influence of the springs 111, when the crossfooter master wheel pick-up bars 109 are disengaged from the column registers 63, as heretofore explained.

To insure that the sliding trip bar 411, 418 shall remain in its right hand, shifted position a sufficient length of time to hold the motor circuit closed until the general operator shaft 174 has substantially completed a single rotation, there has been provided an automatic locking mechanism.

This locking mechanism (Figs. 2, 12, 12ª, 12ᵇ and 13) includes a latch 425 pivotally mounted at 425ª on the right hand side frame 78 of the left hand crossfooter, at a point behind the sliding control bar 418, 411, the latch projecting forwardly with its free end normally lying upon the upper edge of the control bar.

A spring 429 tends to draw the free end of the latch downwardly to cause it to bear upon the upper edge of the control bar 418, 411.

The latch 425 is shown in top plan in Figs. 2 and 13; in front elevation in Figs. 12 and 12ª; and in side elevation in Fig. 12ᵇ, from which views it will be seen that the latch lies adjacent the head of the left hand eccentric rod or pitman 381, the latch having a lateral ear 426 extending into the eccentric path of a stud 428 projecting from the adjacent head of the eccentric rod 381, so that the stud 428 may rock the latch upwardly, as the eccentric approaches the end of its cycle of travel.

Normally, this stud 428 lies above and slightly apart from the ear 426.

The eccentric path of the stud 428 is indicated by the series of small overlapping circles in Fig. 12ᵇ.

The upper edge of the sliding bar 411, 418 for operating the motor circuit bail 206 and the crossfooter carry-restoring clutch-disabling pawl 402, is provided with a notch 427 which, when the bar is in its normal position, lies about in line with the right hand side frame plate 78 of the left hand crossfooter, as indicated in dotted lines in Fig. 12, and shown in full lines in Fig. 12ᵇ. Thus, the notch or recess 427 is normally positioned to the left of the spring-pressed latch 425, which rests on an unrecessed portion of the control bar 418, 411.

The stud 420 on the crossfooter master wheel carriage 101, by shifting the sliding trip bar 411, 418 to the right, as the carriage passes from its units to its sub-units position, causes the trip bar to displace the clutch-disabling pawl 402 and depress the motor circuit control bail 206, and positions the notch 427 in register with the spring-pressed latch 425, which thereupon snaps into the notch to lock the sliding trip bar 411, 418 in effective position against premature return. The motor circuit control bail 206 is thus locked in idle position, as, incidentally, is the clutch-disabling pawl.

As the general operator shaft 174 substantially completes a single revolution, a stud 428 protruding from the eccentric head at the upper end of the carry-restoring rod or pitman 381, collides with the offset ear 426 on the spring-pressed latch 425 to raise the latch out of the notch 427, whereupon the spring 409, aided by the motor circuit bail spring 208, is free to restore the sliding trip bar 411, 418 and shift the clutch disabling pawl 402 to effective position to disengage the clutch dog as the general operator shaft 174 completes its rotation.

The tripping stud 428 disengages from the ear 426 on the latch, as the general operator shaft 174 completes its rotation, whereupon the spring 429 draws the latch 425 down to contact the unmutilated edge of the trip bar 411, 418, the notch 427 having been shifted to the left out of register with the latch.

The spring 208 also rocks the motor control bail 206 upwardly, causing it to strike the extending lip 210ˣ of the movable contact 210 and raise the latter to interrupt the motor circuit.

The disconnection of the latch 425 from the bar 411, 418 with the consequent interruption of the motor circuit, is arranged to occur just as the main drive shaft 174 is about to complete its full 360 degree cycle, at which time there is no work to be done, and the momentum of the parts is sufficient to complete the cycle, during which final increment of movement, the clutch-disabling pawl 402 detains the tail of the clutch dog 388 to effect disengagement of the dog from its ratchet 401.

Changes may be made in the form and arrangement of the several parts described without departing from the spirit and scope of the invention.

What I claim as new, is:

1. In a calculating machine, the combination with a frame; a travelling carriage on the frame; a register on the carriage, including transfer-restoring mechanism; and denomination-selecting mechanism for the register mounted on, and movable with and relatively to the carriage; of a motor relatively to which the carriage travels; a sectional power-drive between the motor and the traveling transfer-restoring mechanism, part of which power drive travels with the carriage, the power drive including a normally idle clutch; means under control of the traveling denomination-selecting mechanism to automatically render the clutch effective to enable the stationary motor to actuate the traveling transfer-restoring mechanism in different positions of the carriage as the denomination-selecting mechanism escapes from the register wheel of lowest denomination.

2. In a calculating machine, the combination with a frame; a travelling carriage on the frame; a motor relatively to which the carriage travels; a register on the carriage, including transfer-restoring mechanism; and denomination-selecting mechanism for the register mounted on, and movable with and relatively to the carriage; of a power-drive between the stationary motor and the traveling transfer-restoring mechanism, including a general operator shaft mounted to travel with the carriage; normally idle connections between the general operator shaft and the transfer-restoring mechanism including a normally disengaged clutch traveling with the carriage; connections between the motor and the general operator shaft; and means controlled by the denomination-selecting mechanism to close the clutch as the denomination-selecting mechanism escapes from the register wheel of lowest denomination.

3. In a calculating machine having a frame; a carriage traveling thereon in letter spacing direction and return; a motor relatively to which the carriage travels; a register on the carriage, including transfer-restoring mechanism; and denomination-selecting mechanism mounted to travel with, and relatively to the carriage; of a power-drive between the motor and the traveling transfer-restoring mechanism, including a normally open, one-revolution clutch traveling with the carriage; and means controlled by the traveling denomination-selecting mechanism to close the clutch in different positions of the carriage relatively to the motor as the denomination-selecting mechanism escapes from the register wheel of lowest denomination.

4. In a calculating machine having a frame, a traveling carriage on the frame; a motor on the frame; a register on the carriage, including a transfer-restoring mechanism; and a denomination-selecting mechanism for the register mounted to travel on, and relatively to the carriage; the combination of a power-drive between the motor and the traveling transfer-restoring mechanism, including a clutch traveling with the carriage; a clutch detent normally effective to retain the clutch members disengaged; and a clutch detent-controlling member operable by the denomination-selecting mechanism to displace the clutch detent and enable the clutch to become effective as the denomination-selecting mechanism escapes from the register wheel of lowest denomination.

5. In a calculating machine having a frame; a traveling carriage on the frame; a motor on the frame; a register on the carriage, including a transfer-restoring mechanism; and a denomination-selecting means for the register mounted to travel on the carriage; the combination of a power-drive between the traveling motor and the transfer-restoring mechanism, including a clutch traveling with the carriage and having drive and driven members; a clutch detent normally holding the driven member of the clutch out of engagement with its drive member; latching means to prevent back-lash of the driven member; and means controlled by the denomination-selecting mechanism to displace the clutch detent to free the clutch for a single revolution.

6. In a calculating machine having a frame; a traveling carriage on the frame; a motor on the frame; a register on the carriage, including transfer-restoring mechanism; and a denomination-selecting mechanism mounted on, to travel with, and relatively to the carriage; the combination of a power-drive between the motor and the traveling transfer-restoring mechanism, including a general operator shaft on the carriage; a normally idle clutch on the general operator shaft, including drive and driven members, the motor adapted to drive the general operator shaft and the drive member of the clutch; an eccentric actuated by the driven member of the clutch; a positive connection between the eccentric and the transfer-restoring mechanism; and means controlled by the denomination-selecting mechanism to render the clutch effective.

7. In a calculating machine having a frame; a traveling carriage on the frame; a motor on the frame; a register on the carriage, including transfer-restoring mechanism; and a denomination-selecting mechanism mounted on, to travel with, and relatively to the carriage; the combination of a normally idle clutch between the motor and the traveling transfer-restoring mechanism; a clutch control member operable by the denomination-selecting mechanism at one end of its travel, to render the clutch effective; and means to return the denomination-selecting mechanism and the clutch control member to their respective normal positions to render the clutch ineffective.

8. In a machine of the class described, the combination with a frame; a carriage traveling thereon; a register on the carriage, including a carry-restoring mechanism; denomination-selecting mechanism for the register, said denomination-selecting mechanism movable with and relatively to the carriage; and a motor on the frame; of driving mechanism between the stationary motor and the traveling carry-restoring mechanism, including a normally disengaged clutch traveling with the carriage; and clutch-releasing means operable by the denomination-selecting mechanism of the traveling register to free the clutch for effective operation as the denomination-selecting mechanism escapes from the register wheel of lowest denomination.

9. In a machine of the class described, the combination with a frame; a carriage traveling thereon; a register on the carriage, including a carry-restoring mechanism, denomination-selecting mechanism for the register, said denomination-selecting mechanism movable with and relatively to the carriage; and a motor on the frame; of normally ineffective driving mechanism between the stationary motor and the traveling carry-restoring mechanism, including a clutch; and means on the carriage operable by the traveling denomination-selecting mechanism to render the clutch effective as the denomination-selecting mechanism escapes from the register wheel of lowest denomination.

10. In a machine of the class described, the combination with a frame; a carriage traveling thereon; a motor on the frame; a register on the carriage, including a master wheel and its truck shiftable axially relatively to the register, normally cocked carrying members adapted to be tripped by the appropriate register wheels; and means to restore the carrying members to their normal positions; of a shaft mounted in the carriage to travel therewith; power transmitting connections between the motor and the shaft; a single cycle clutch comprising a driving element connected to the shaft, and a driven element; transmission means between the driven element of the clutch and the carry-restoring mechanism; normally effective clutch-disabling means; and means controlled by the master wheel truck to shift the clutch-disabling means to ineffective position and to enable return of the clutch-disabling means to its effective position.

11. In a machine of the class described, the combination with a frame; a carriage traveling thereon; a register on the carriage, including a carry-restoring mechanism; denomination-selecting mechanism for the register, said denomination-selecting mechanism movable with and relatively to the carriage; and a motor on the frame; of means to retain the clutch-releasing means in operative position; and means controlled by the driving means for the carry-restoring mechanism to return the retaining means to its normal idle position.

12. In a writing-calculating machine, having keys; a register and a master wheel relatively movable axially; denomination-selecting means controlled by the keys to enable engagement of the master wheel and successive wheels of the register; a motor; and a motor circuit having a normally open switch; the combination with carrying mechanism for the register; and a carry-restoring member; of means to automatically cause the actuation of the carry-restoring member, including a normally open, one-revolution clutch interposed between the motor and the carry-restoring member, the clutch having drive and driven elements; a normally effective clutch-disabling detent; means controlled by the denomination-selecting mechanism to trip the clutch-disabling detent to enable the clutch to function, and substantially simultaneously to close the motor circuit, said last-named means operable to free the clutch-disabling detent for return to its effective position, and to enable the switch to open to interrupt the motor circuit; and means to temporarily delay the clutch-disabling and switch-opening operations.

13. In a writing-calculating machine, having keys; a register and a master wheel relatively movable axially; denomination-selecting means controlled by the keys to enable engagement of the master wheel and successive wheels of the register; a motor; and a motor circuit having a normally open switch; the combination with carrying mechanism for the register; and a carry-restoring member; of means to automatically cause the actuation of the carry-restoring member, including a normally open, one-revolution clutch interposed between the motor and the carry-restoring member, the clutch having drive and driven elements; a normally effective clutch-disabling detent; means controlled by the denomination-selecting mechanism to trip the clutch-disabling detent to enable the clutch to function, and substantially simultaneously to close the motor circuit, said last-named means operable to free the clutch-disabling detent for return to its effective position, and to enable the switch to open to interrupt the motor circuit; latching means to temporarily retain the means controlled by the denomination-selecting mechanism, in its effective position, to delay the clutch-disabling and switch-opening operations; and means under control of the carry-restoring mechanism to render the latching means ineffective.

14. In a calculating machine, the combination with a frame; a key carriage travelling on the frame; a register on the carriage, including transfer-restoring mechanism; and denomination-selecting mechanism for the register, mounted on, and movable with, and relatively to the carriage; of a motor; a power-transmitting mechanism between the motor and the transfer-restoring mechanism, including a clutch; a normally effective clutch-disabling member to maintain the clutch idle; and a clutch control member separate from and located in the path of, the denomination-selecting mechanism, to be actuated thereby as said denomination-selecting mechanism escapes from the register wheel of lowest denomination, to trip the clutch-disabling member, whereby to free the clutch for operation.

15. In a calculating machine, the combination with a frame; a key carriage travelling step by step in one direction on the frame; a register on the carriage, including transfer-restoring mechanism; and denomination-selecting mechanism, shiftable with and relatively to the carriage, to enter amounts into the register as the carriage advances in step by step direction; of a motor; a power-transmitting mechanism between the motor and the transfer-restoring mechanism, including a clutch; a normally effective clutch-disabling member; a clutch control member separate from and operable by the denomination-selecting mechanism, and relatively to which the denomination-selecting mechanism shifts throughout the greater part of its travel; means to return the clutch control member to one of its positions; automatically operable means to latch the clutch-control member in another of its positions to which it is shifted by the denomination-selecting mechanism, to render idle the clutch-disabling member; and automatically operable means to trip the latch and free the clutch-control member to the action of its return means, whereby to enable the clutch-disabling member to restore to its effective position.

16. In a calculating machine, the combination with a stationary support; a carriage travelling step by step in one direction and return on the support; a register on and movable with the carriage, including transfer-restoring mechanism; and denomination selecting mechanism shiftable with and relatively to the carriage, to enter items digit by digit into successive wheels of the register; of a motor on the support; a power-transmitting mechanism between the motor and the transfer-restoring mechanism, effective to transmit power to operate the transfer-restoring mechanism in any position of the carriage relatively to its support, the power-transmitting mechanism including a clutch; a normally effective clutch-disabling member; a clutch-control member normally stationary on the carriage, and actuated by the denomination-selecting mechanism only as the latter shifts past the register wheel of lowest denomination; means to retain the clutch-control member in its actuated position; means operable from the driven member of the clutch to displace the retaining means; and means to restore the denomination-selecting mechanism, and the clutch-control member to their normal positions to enable the clutch-disabling member to become effective.

17. In a calculating machine having a support; a key carriage travelling thereon in letter spacing direction and return; the combination of a register mounted on the carriage, including a transfer-restoring mechanism; and a denomination-selecting mechanism mounted on the carriage to travel therewith, and also relatively thereto; of a motor on the support, a power-transmitting mechanism, including a normally idle clutch, to directly connect the stationary motor with the transfer-restoring mechanism on the travelling carriage at various selected points in the travel of the latter; a clutch detent normally effective to retain the clutch members disengaged; a clutch-control member operable by the denomination-selecting mechanism to displace the clutch detent, whereupon the clutch becomes effective; and means to return the clutch-control members and the clutch detent to their normal positions.

18. In a calculating machine having a support; a key carriage travelling thereon in letter spacing direction and return; the combination of a register mounted on the carriage, including a transfer-restoring mechanism; and a denomination-selecting mechanism mounted on the carriage to travel therewith, and also relatively thereto; of a motor on the support, a power-transmitting mechanism, including a normally idle one-revolution clutch to directly connect the stationary motor with the carry-restoring mechanism on the travelling carriage at various selected points in the travel of the latter; a clutch detent normally effective to retain the clutch members disengaged; a normally idle clutch control member operable only when the denomination-selecting mechanism passes beyond the register in one direction to displace the clutch detent to free the clutch for operation; and means to return the clutch control member to its idle position.

HARRY A. FOOTHORAP.